M. J. MYERS, DEC'D.
L. O. MYERS, ADMINISTRATRIX.
INSTRUMENT FOR LOCATING BREAKS AND GROUNDS IN ELECTRIC WIRES.
APPLICATION FILED MAY 5, 1910.

1,095,284.

Patented May 5, 1914.

4 SHEETS—SHEET 1.

WITNESSES:
Chas. H. Young.
S. Davis.

INVENTOR
Matthew Jarvis Myers
BY
Parsons Hall & Bodell
ATTORNEYS

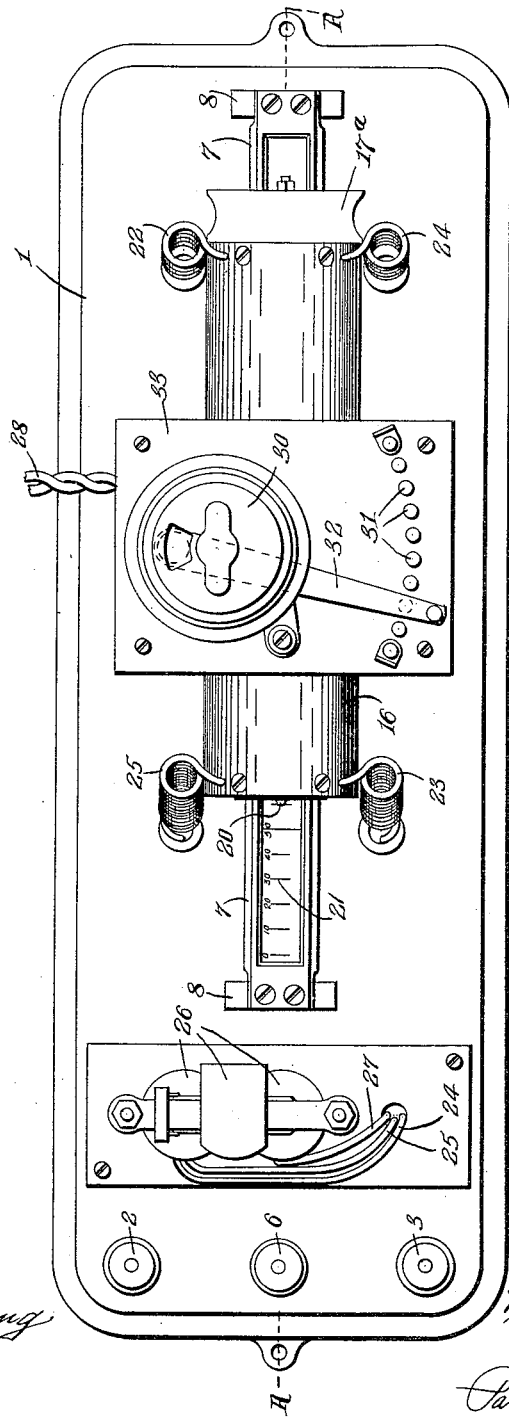

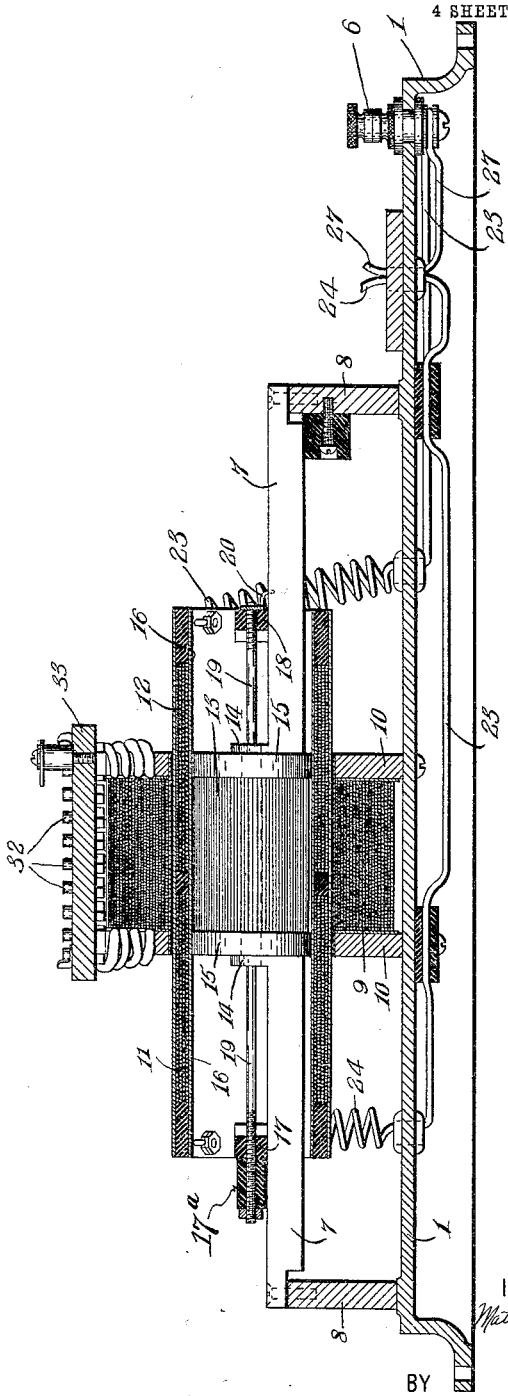

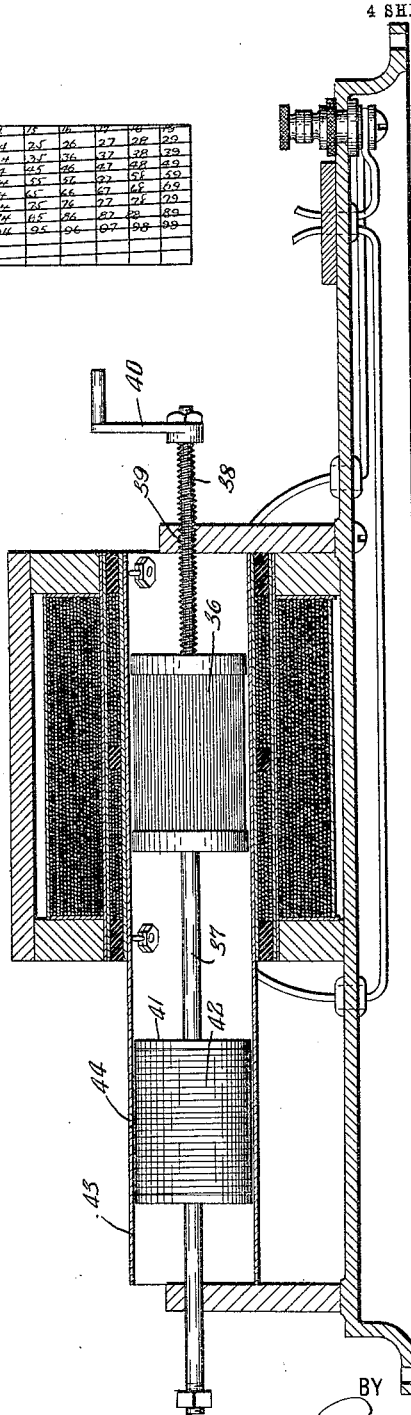

UNITED STATES PATENT OFFICE.

MATTHEW JERVIS MYERS, OF SYRACUSE, NEW YORK; LUCY O. MYERS, OF SYRACUSE, NEW YORK, ADMINISTRATRIX OF SAID MATTHEW JERVIS MYERS, DECEASED, ASSIGNOR, BY MESNE ASSIGNMENTS, TO LUCY O. MYERS, OF SYRACUSE, NEW YORK.

INSTRUMENT FOR LOCATING BREAKS AND GROUNDS IN ELECTRIC WIRES.

1,095,284.     Specification of Letters Patent.     Patented May 5, 1914.

Application filed May 5, 1910. Serial No. 559,443.

*To all whom it may concern:*

Be it known that I, MATTHEW JERVIS MYERS, of Syracuse, in the county of Onondaga and State of New York, have invented a certain new and useful Instrument for Locating Breaks and Grounds in Electric Wires, of which the following is a specification.

My invention has for its object the production of a particularly simple and efficient instrument for comparing the electric capacity, or resistance of circuits, which is particularly applicable for locating breaks and grounds in the wires of telegraph and telephone lines, etc., and it consists in the combinations and constructions hereinafter set forth and claimed.

In describing this invention, reference is had to the accompanying drawing, in which like characters designate corresponding parts in all the views.

Figure 1:
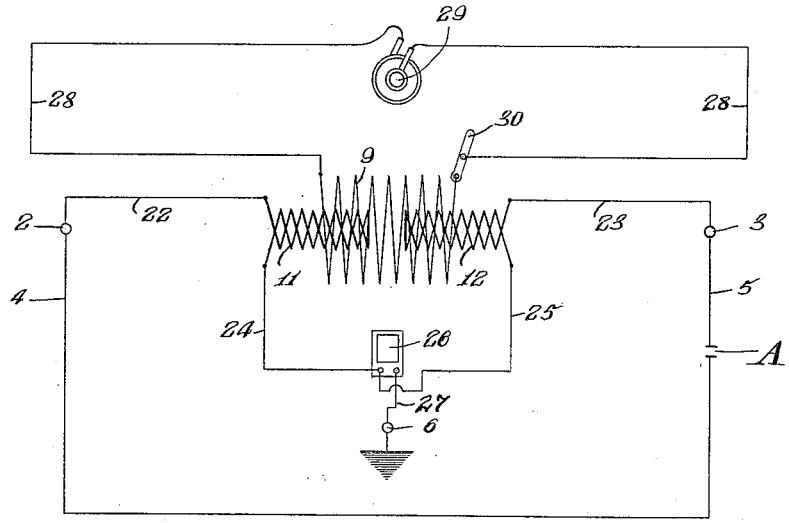
Figure 4:
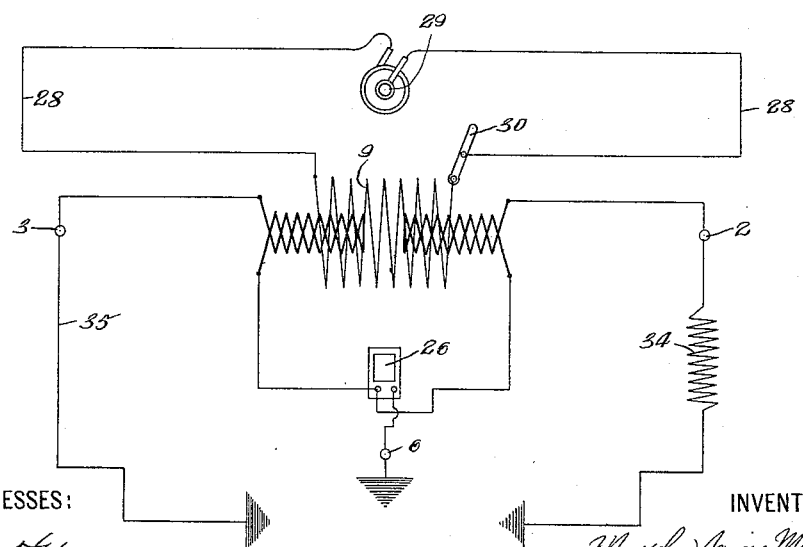

Figure 1 is a diagrammatic view illustrating one use of my instrument. Fig. 2 is a plan of my instrument. Fig. 3 is a longitudinal sectional view, partly in elevation, on line A—A, Fig. 2. Fig. 4 is a diagrammatic view illustrating another use of my instrument. Fig. 5 is a sectional view of a modified form of my instrument. Fig. 6 is a plan view of the chart used in connection with the instrument shown in Fig. 5.

This instrument comprises generally a magnetizing member or primary conductor, a plurality of members or secondary conductors arranged within the influence of the magnetizing member or primary conductor and designed to be connected in the circuits to be electrically compared, said primary and secondary conductors having relative movement for equalizing the influence of the magnetizing member on the secondary members or conductors and circuits connected thereto, or for positioning said members until the electromotive force induced in the secondary members will produce such a condition in the circuits that there will be no flow of current through the indicator to be described, and the instrument includes means for indicating the relative movement of the members at the time the current in either secondary member and circuit connected thereto equalizes the current in the other magnetizable member and circuit connected thereto. The circuits in which the secondary conductors are connected may be the limbs of the line or wire to be tested for a break or ground, or the circuit connected to one of such members may be a local circuit of known capacity, or resistance, and the circuit connected to the other of such members may be any circuit of unknown capacity or resistance, the comparison being made between the local circuit of known capacity or resistance, and the circuit of unknown capacity or resistance. The locating of the break or ground in a line depends upon the difference of potential between one secondary member and circuit connected thereto, and the other of such members and circuit connected thereto. This difference in some instances depends on the resistance and in other instances on the capacities of the circuits being compared, as hereinafter explained.

In the illustrated embodiment of my instrument 1 is a base having two binding posts or terminals 2, 3 adapted to be connected respectively in the branches or limbs 4, 5, Fig. 1, to be tested for a break or ground, and a single binding post 6 designed to be connected in the circuit to be compared, as the limbs 4 and 5, Fig. 1, with their ground wires, or in case ground wires are not used, the single terminal 6 is grounded.

7 is a guide extending lengthwise of the base and spaced apart from the upper face of the base, this guide being supported on the upper ends of standards 8.

9 is a magnetizing member, as a primary coil, suitably supported on the base, as by heads 10.

11 and 12 are secondary conductors or coils which are preferably movable along the guide 7 axially through the primary coil 9.

13 is a fixed core for the primary coil, the core being located within the secondary coils, 11, 12 and acting to concentrate the magnetic field of the primary coil in order that a comparatively strong current may be induced in the secondary coils. The core 13 is supported by the guide 7, and as here shown, Fig. 3, the guide is formed in two sections which are provided with lugs 14 at their opposing ends, the lugs being fixed to the heads 15 of the core. The heads 15 hold the bundle of wires constituting the core in form and are rigidly connected in any suitable manner.

The secondary coils 11 and 12 are oppositely wound on the opposite ends of a suitable barrel or spool 16 inclosing the core 13 and provided with means engaging the guide 7. Said means is here shown as cross bars 17, 18 at the ends of the spool 16, the bars being connected by a rod 19 extending through the core 13. One of said bars, as 17, is provided with a handle 17$^a$ by which the spool can be moved along the guide 7, and the other bar 18 carries a pointer 20 which coacts with a scale 21 provided on the guide 7. Corresponding ends of the secondary coils 11, 12 are connected, respectively, to the binding posts 2, 3 by conductors 22, 23, and the other ends of said coils are connected by conductors 24, 25 to the coil of a current indicating means, and an electromagnetic signaling device, here shown as a buzzer 26, the coils of said buzzer being connected by a conductor 27 to the single binding post 6, which, as before stated, is connected in the circuits to be compared.

The scale 21 is provided with graduations running from the ends of the scale toward the center thereof and representing fractions or percentages of the length of the line. The graduations of the scale as here represented, illustrate the percentages from 0 to 50, those on one side of the central graduation 50 applying to one part of the line being tested, and those on the other side of the center corresponding to another part of said line.

The primary coil 9 is designed to be connected in any suitable circuit 28 containing a source of supply of electricity, as a generator 29, and preferably said primary coil is made up of a plurality of units, corresponding ends of which are connected to one pole of a switch 30 and the opposite ends of which are connected to suitable terminals 31 with which a switch-arm 32 coacts, said arm 32 being connected to the other pole of the switch 30. The units of the coil are of different lengths in order that currents of different strengths may be induced in the secondary coils. The switch 30, terminals 31, and arm 32 are mounted on a support 33 carried by the heads 10 above the primary coil.

In the operation of my instrument, when used, as illustrated in Fig. 1, the pairs of terminals or binding posts 2, 3 are connected in any suitable manner in the line to be tested, and the switch 30 is turned so that a current flows through the primary coil, and currents are induced in the secondary coils. If the line is broken as indicated at A, Fig. 1, on either side of its center, the limbs of the broken circuit will be of different lengths, and consequently, the secondary coils and limbs connected thereto will be of different capacities, and the pointer carried by the secondary coils will be moved to indicate on the scale a graduation from which the location of the break can be reckoned, when said coils are moved axially of the primary coil until said secondary coils and the limbs of the line connected thereto are affected equally by the magnetic field of the primary conductor. For instance, when the instrument is used to detect a ground, if the pointer indicates the 10% graduation on one side, as the right side of the center graduation 50, the location of the ground is approximately 10% out on the right leg of the circuit from the testing station. In the case of a ground the operation depends upon the resistance when the greater resistance is on the left side of the line, the coil connected to the left side of the line is weaker than the coil on the right side. Hence the coil connected to the right side of the line of greater resistance will have to occupy a position farther in the magnetic field in order to equalize the coils, thus carrying the pointer to the right side of the center graduation 50. Obviously, before the action of the primary coils on the secondary coils is equalized; that is, while the current in one secondary coil is stronger than the current in the other, the signal or buzzer operates and will cease to operate as soon as the equalizing point is reached. When the instrument is used for detecting a break, the operation thereof depends (all other conditions being equal, as for instance, the location of the wires with respect to the ground) upon the difference of capacity of the legs of the broken circuit connected respectively to the secondary coil, the longer limb being of greater capacity and hence the coil connected thereto when the pointer 20 is on the 50% mark, has a greater current flow than the other secondary coil. When the instrument is used to detect a break, it is used as when detecting a ground but in reckoning the location of the ground of the scale the position of the pointer is considered as if the pointer were indicating the corresponding graduation of the other side of the central point 50 of the scale, for instance, if the pointer indicates the 10% graduation on the left half of the scale corresponding to the left limb or leg of the circuit, the operator reckons location of the break as if the point indicates the 10% ground on the other half of the scale, for instance, when the break is in the right limb or leg of the circuit, the left leg will be the larger capacity and hence the coil connected to the left leg will be stronger than the coil connected to the right leg, and the secondary coils will have to be shifted to the left moving the stronger coil out of the field and the weaker farther into the field until the coils are neutralized. Therefore, the pointer will indicate on the left hand side of the 50% mark and the operator will know that the break is 10% out on the right limb or leg. If the line is grounded 10% out on the right leg, the pointer will indicate the 10% graduation on the right side of the center, if however, the line instead of being grounded is broken at the same point, the pointer will indicate the 10% graduation on the left hand side of the central 50% mark. In the case of a ground the coil connected to the longer leg is weaker as the longer leg is of greater resistance; in case of a break the coil connected to the longer leg is stronger and of greater capacity. Hence, to neutralize or equalize the effect of the primary coils on the secondary coils, in the first instance, the coils must be moved to carry the one connected to the longer leg farther into the magnetic field, while in the second instance, the coil connected to the longer leg must be moved farther out of the magnetic field.

In Fig. 4, my instrument is shown as adapted to compare a circuit of known capacity, or resistance, with one of unknown capacity or resistance, and a circuit 33 provided with a coil 34 of known resistance, or a condenser, not shown, of known capacity, is connected to the binding posts 2 and 6, and a circuit 35 of unknown resistance or capacity is connected to the binding posts 3 and 6. The capacity or resistance of a circuit having been found, other facts, which it is desired to learn, can be determined.

In Fig. 5 is shown a modified form of my instrument in which the relative movement of the primary member and the secondary members is effected by shifting the core 36 of the magnetizing member axially and thus shifting the location of the magnetic field. The core 36 is mounted upon the rod 37 threaded at 38 at one end, and extending through a threaded passage 39 and having a handle or crank 40 at its outer end. The opposite end of such rod extends beyond the magnetizable members and carries a cylinder 41 having a chart 42 on its periphery. This cylinder is located within a tube 43 extending through the secondary members and also inclosing the core, said tube having a sight opening 44 through which the chart 42 on the cylinder 41 can be read. Obviously, as the rod is turned the core will be moved axially and the cylinder rotated and moved axially therewith so that the different members on the chart on the cylinder will be visible through the sight opening. The number on the chart visible through the opening when the core 36 has been shifted to a point where the influence of the field on both secondary members and lines connected thereto is equalized, is the key to a map or chart showing different localities of the circuits being tested. One form of chart adaptable for my instrument illustrated in Fig. 5, is shown in my Patent No. 944,459, issued Dec. 28, 1909.

My instrument is particularly advantageous over other instruments of the same class having a plurality of primary coils and a single secondary coil, for the reason that a core can be used for my single primary coil so that a much stronger current is induced in the secondary coils and a signal requiring a stronger current to operate it can be used. In these prior instruments referred to a delicate signaling device as a telephone receiver must be used and such device or receiver is influenced by extraneous currents and is not acted upon solely by the current in the secondary conductor so that it is difficult and oftentimes impossible to ascertain with accuracy where the trouble on the line is located.

What I claim is:—

1. In an instrument of the class described, a base, a guide supported by the base, two terminals adapted to be connected respectively in circuits to be electrically compared, a single terminal designed to be electrically connected in both of said circuits to be compared, a plurality of oppositely acting secondary coils movable along the guide axially of the primary coil, ends of the secondary coils being connected respectively to the two terminals and the other ends thereof being connected to said single terminal, a core for the primary coil, and means for indicating the movement of the secondary coils, substantially as and for the purpose specified.

2. In an instrument of the class described, a base, a guide supported by the base, two terminals adapted to be connected respectively in circuits to be electrically compared, and a single terminal designed to be electrically connected in both of said circuits to be compared, a fixed primary coil, a plurality of oppositely acting secondary coils movable along the guide axially of the primary coil, ends of the secondary coils being connected respectively to the two terminals and the other ends thereof being connected to said single terminal, a support fixed relatively to the base, a core for the primary coil within the secondary coils, the core being carried by the support, a scale arranged along the guide, and a pointer movable with the secondary coils and along the scale, substantially as and for the purpose described.

In testimony whereof, I have hereunto signed my name in the presence of two attesting witnesses, at Syracuse, in the county of Onondaga, in the State of New York, this 25th day of Feb., 1910.

MATTHEW JERVIS MYERS.

Witnesses:
CHAS. H. YOUNG,
S. DAVIS.

Copies of this patent may be obtained for five cents each, by addressing the "Commissioner of Patents, Washington, D. C."